(12) United States Patent
Hosac

(10) Patent No.: US 11,858,715 B2
(45) Date of Patent: Jan. 2, 2024

(54) COLLECTABLE ABSORBER CANISTERS

(71) Applicant: Tracy Hosac, Pittsburgh, PA (US)

(72) Inventor: Tracy Hosac, Pittsburgh, PA (US)

(*) Notice: Subject to any disclaimer, the term of this patent is extended or adjusted under 35 U.S.C. 154(b) by 234 days.

(21) Appl. No.: 17/424,340

(22) PCT Filed: Jan. 21, 2020

(86) PCT No.: PCT/US2020/014313
§ 371 (c)(1),
(2) Date: Jul. 20, 2021

(87) PCT Pub. No.: WO2020/154237
PCT Pub. Date: Jul. 30, 2020

(65) Prior Publication Data
US 2022/0089352 A1 Mar. 24, 2022

Related U.S. Application Data

(60) Provisional application No. 62/847,353, filed on May 14, 2019, provisional application No. 62/794,727, filed on Jan. 21, 2019.

(51) Int. Cl.
*B65D 81/26* (2006.01)
*A44C 25/00* (2006.01)
(Continued)

(52) U.S. Cl.
CPC .......... *B65D 81/266* (2013.01); *A44C 25/002* (2013.01); *B01D 53/261* (2013.01);
(Continued)

(58) Field of Classification Search
CPC .... A44C 25/002; A45D 19/02; B01D 53/261; B01D 53/407; B01D 53/0415;
(Continued)

(56) References Cited

U.S. PATENT DOCUMENTS 3,567,085 A * 3/1971 Flores .................. B65D 81/266
224/604
5,114,003 A 5/1992 Jackisch et al.
(Continued)

FOREIGN PATENT DOCUMENTS

CN 208418484 U * 1/2019 ............... F21S 9/02
JP 2001314728 A 11/2001
(Continued)

OTHER PUBLICATIONS

Arun Shanbhag, Vaccination Beads: A Visual and Digital Vaccination Record, Grand Challenges, Immunization delivery May 1, 2018, [retrieved on May 5, 2019]. Retrieved from the Internet, URL; https://gcgh.grandchallenges.org/grant/vaccination-beads-visual-and-digital-vaccination-record, 1 page.
(Continued)

*Primary Examiner* — Stephen R Burgdorf
(74) *Attorney, Agent, or Firm* — Thomas M. Joseph, Esq.

(57) ABSTRACT

A collectable absorber canister has a predetermined outer configuration selected from the group consisting of an organic shape, an inorganic shape, and a composite shape. A collecting device stores the collectable absorber canister.

18 Claims, 6 Drawing Sheets

(51) Int. Cl.
*B01D 53/26* (2006.01)
*G08B 5/22* (2006.01)
*G06Q 30/0241* (2023.01)

(52) U.S. Cl.
CPC ............ *G08B 5/22* (2013.01); *B65D 2203/10* (2013.01); *G06Q 30/0277* (2013.01)

(58) Field of Classification Search
CPC ...... B65D 47/20; B65D 47/32; B65D 81/266; B65D 75/00; B65D 85/808; B65D 2203/10; B67D 1/0801; F25B 43/003; G01D 3/10; G06Q 10/087; G06Q 30/0277; G08B 5/22
USPC ...................................................... 340/815.4
See application file for complete search history.

(56) References Cited

U.S. PATENT DOCUMENTS

| | | | |
|---|---|---|---|
| 5,529,203 | A | 6/1996 | Flaugher |
| 5,540,348 | A | 7/1996 | Wood |
| 5,569,316 | A | 10/1996 | Flaugher et al. |
| 5,716,432 | A | 2/1998 | Perrine |
| 5,743,942 | A | 4/1998 | Shelley et al. |
| 5,935,304 | A | 8/1999 | Shelley et al. |
| 6,479,016 | B1 | 11/2002 | Goldsmith et al. |
| D478,973 | S | 8/2003 | Wagner |
| D698,653 | S * | 2/2014 | Schumaier ............... D9/518 |
| D939,684 | S * | 12/2021 | Latre Navarro ............ D23/366 |
| 2003/0186004 | A1 | 10/2003 | Koslow |
| 2007/0029400 | A1 | 2/2007 | Magargee et al. |
| 2008/0025803 | A1 | 1/2008 | Hecht |
| 2010/0102142 | A1 | 4/2010 | Tagliareni |
| 2011/0048976 | A1 | 3/2011 | Dick et al. |
| 2012/0055984 | A1 * | 3/2012 | Van Megchelen ..... G06Q 30/02 235/494 |
| 2012/0061261 | A1 | 3/2012 | Hsu |
| 2012/0085828 | A1 * | 4/2012 | Ziegler ................. G09F 3/0335 235/494 |
| 2014/0259835 | A1 | 9/2014 | Ptak et al. |
| 2015/0287346 | A1 | 10/2015 | Ward et al. |
| 2017/0028304 | A1 | 2/2017 | Stray et al. |
| 2018/0339834 | A1 | 11/2018 | Machado |
| 2019/0130675 | A1 | 5/2019 | Siebels et al. |

FOREIGN PATENT DOCUMENTS

| | | | | |
|---|---|---|---|---|
| JP | 2005018271 | A * | 1/2005 | ............ G06F 17/80 |
| WO | 0170591 | A1 | 9/2001 | |
| WO | WO-0250609 | A2 * | 6/2002 | ............ C12Q 1/004 |
| WO | 2017059480 | A1 | 4/2017 | |

OTHER PUBLICATIONS

International Search Report and Written Opinion for Application No. PCT/US2020/014313, dated Mar. 19, 2020, 11 pages.
PackFreshUSA's Blog, Using Oxygen Absorbers for Jerky & Snacks, [retrieved on Nov. 26, 2019]. Retrieved from the Internet, URL; https://packfreshusa.com/blog, 7 pages.
The Immunity Charm-Making immunization into a tradition, [retrieved on May 5, 2019]. Retrieved from the Internet, URL; http://www.theimmunitycharm.org/, 7 pages.

* cited by examiner

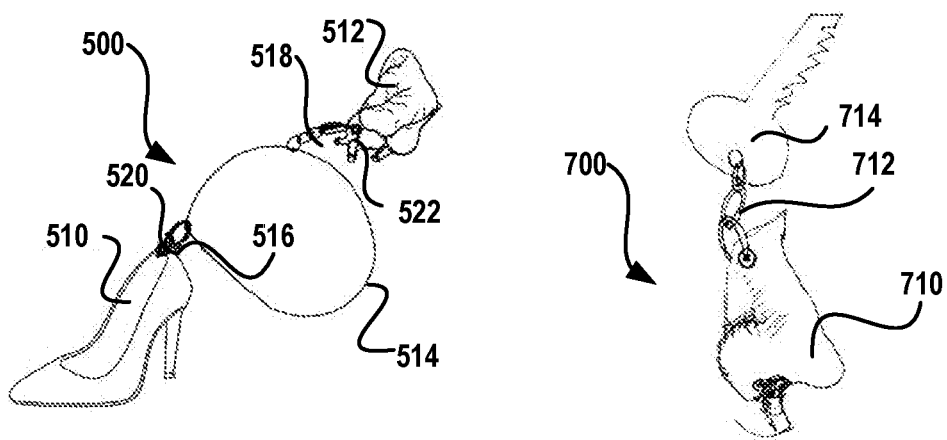
FIG. 5
FIG. 7
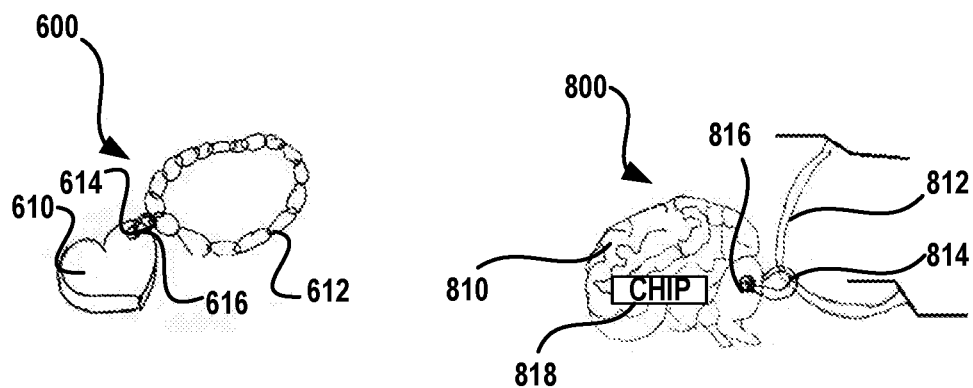
FIG. 6
FIG. 8

COLLECTABLE ABSORBER CANISTERS

CROSS REFERENCE TO RELATED APPLICATIONS

The present application is a U.S. national stage application of PCT International Application No. PCT/US2020/014313, filed Jan. 21, 2020, and published as PCT Publication WO/2020/154237 on Jul. 30, 2020, which claims priority to U.S. Patent Application No. 62/847,343, filed on May 14, 2019, and U.S. Patent Application No. 62/794,727, filed on Jan. 21, 2019. The disclosures of all the foregoing applications are hereby incorporated by reference in their entirety into the present application.

TECHNICAL FIELD

The subject disclosure is directed to collectable absorber canisters. The canisters are collectable vessels for storing absorbers having predetermined shapes and colors that can be attractive, ornamental and/or meaningful.

BACKGROUND ART

Some perishable products, such as pharmaceutical or food products, degrade when they are exposed to moisture, oxygen, or other similar substances for extended periods of time. Perishable products are often stored in a sealed container in an attempt to prolong their useful life. However, the seal on such containers is never perfect, particularly if the containers are disposable. Therefore, over time, the perishable products can dry out or, in some cases, can absorb water and become damp.

Reduced levels of moisture within a container that can hold a perishable product can be difficult to maintain once the container has been opened. To address these problems, it has become standard practice to place a moisture absorbing material, such as a desiccant canister within such packages. Desiccants can control the moisture content (or humidity) of the atmosphere in which perishable products are stored in order to prevent them from deteriorating. It is therefore desirable to provide an improved desiccant canister for controlling the moisture content of the atmosphere within perishable product packaging.

DISCLOSURE OF INVENTION

In various implementations, a kit includes a collectable absorber canister having a predetermined outer configuration selected from the group consisting of an organic shape, an inorganic shape, and a composite shape, and a fastening mechanism extending therefrom. A collecting device has at least one jewelry finding for receiving the collectable absorber canister fastening mechanism.

BRIEF DESCRIPTION OF THE DRAWINGS

FIG. 5 is a schematic diagram of another exemplary embodiment of a charm bracelet having a plurality of collectible absorber canisters in accordance with this disclosure.

FIG. 6 is a schematic diagram of another exemplary embodiment of a charm bracelet having a single collectible absorber canister in accordance with this disclosure.

FIG. 7 is a schematic diagram of another exemplary embodiment of a keychain having a single collectible absorber canister in accordance with this disclosure.

FIG. 8 is a fragmentary schematic diagram of another exemplary embodiment of a charm bracelet having a single collectible absorber canister in accordance with this disclosure.

MODES FOR CARRYING OUT THE INVENTION

Figure 1:
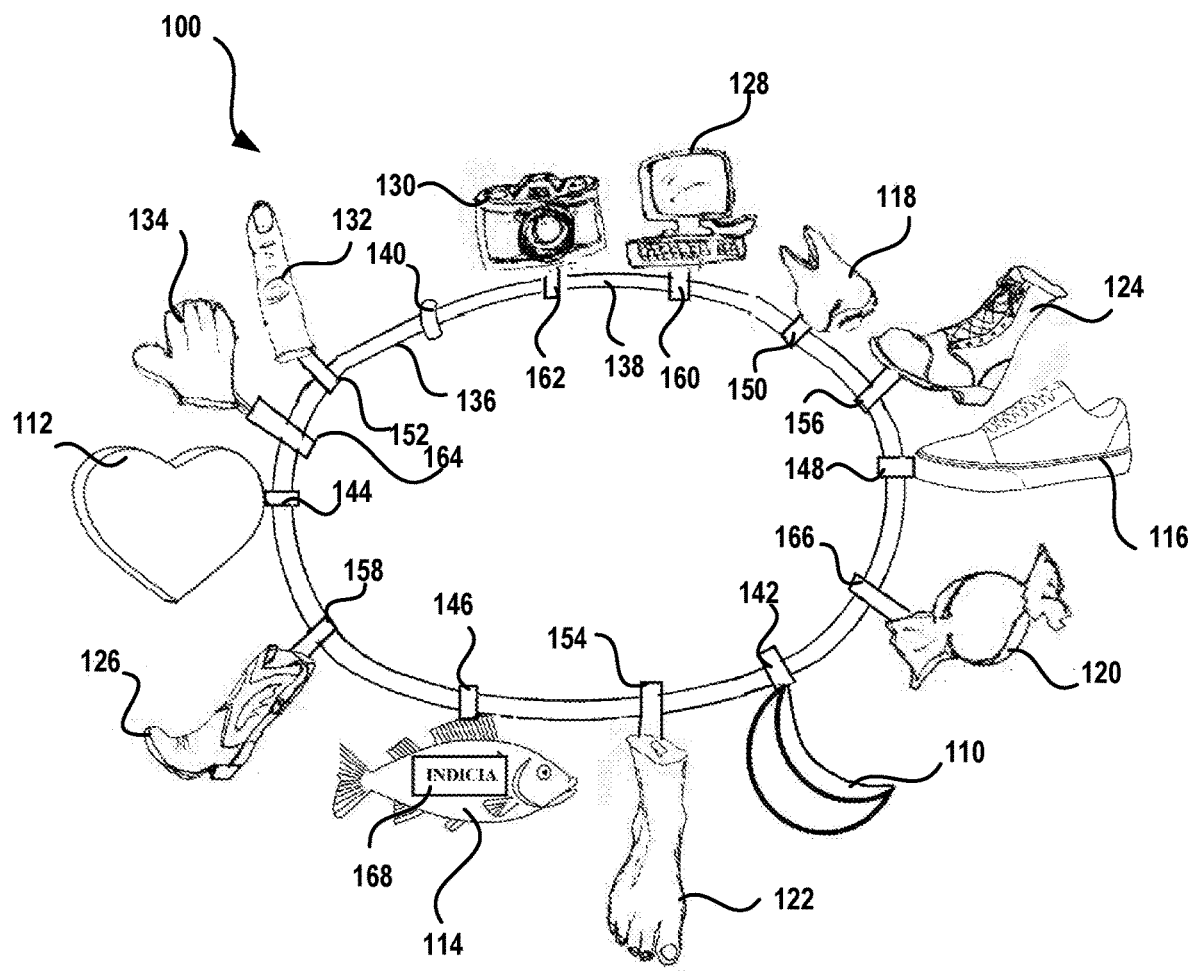
FIG. 1 is a schematic diagram of a charm bracelet having a plurality of collectible absorber canisters in accordance with this disclosure.

The subject disclosure is directed to collectable vessels for storing absorbers or collectable absorber canisters having predetermined shapes and colors that can be attractive, ornamental and/or meaningful. The absorber canisters are used in containers that store perishable products. The predetermined shapes or outer configurations of the absorber canisters can have a predetermined relationship with the perishable products for identification purposes. The absorber canisters have specific applications in the medical, nutritional, collectable, advertising, and marketing fields. The absorber canisters can be used with electronics, apparel, leather goods, and textiles.

The disclosure is directed to a custom visual identification system that utilizes collectable absorber canisters having predetermined shapes that provides consumers with the ability to quickly identify products that are packaged therewith. Such products normally utilize small product codes that are easily confused with other medications and vitamins that resemble one another in close range.

The collectable absorber canisters can be used in bottles and packages to identify unique products for pharmaceutical, vitamins, and food products. The outer configurations of each collectable absorber canister can help consumers quickly identify their products to help give consumers excellent visual information on products that might otherwise be difficult to recognize.

The disclosed collectable absorber canisters can have various predetermined configurations that correspond to animals, charms, surprises, and other similar objects, as opposed to the conventional shapes (i.e., cylinders, bags, and sheets). The predetermined configurations can include geometric shapes, organic shapes, inorganic (i.e., abstract shapes), or composite shapes that are combination of two or more of these shape classifications. These shapes can include shapes of numbers, letters, symbols, and logos.

Geometric shapes have precise edges and mathematically consistent curves. Geometric shapes include conventional Euclidian geometric shapes, such as polyhedra, ellipsoids (i.e., egg-shaped or sphere-shaped objects), cylinders, and cones.

Other types of geometric shapes include spheres, tori, cubes, cuboids, pyramids, and prisms. Additionally, geometric shapes can include three dimensional metaphorical shapes, such as three dimensional versions of asteroids, bowtie-shaped objects, cross-shaped objects, donut-shaped objects, heart-shaped objects, hourglass shaped objects, half-moon shaped objects, dog bone-shaped objects, inverted bell-shaped objects, mushroom-shaped objects, pear-shaped objects, star-shaped objects, and tomahawk objects.

Organic shapes include free-form shapes that flow in appearance and appear in the natural world. Organic shapes and flowing in appearance. Organic shapes can include shapes of plants, animals, other living things, or man-made objects, or representations of naturally-formed objects.

Organic shapes include shapes of humans that are living, dead, fictional, or cartoonish. Organic shapes can include shapes of animals that are vertebrates, invertebrates, anthropomorphic or cartoonish. Organic shapes can include fruits, vegetables, edible plants, and non-edible plants. Organic shapes can include animal parts or plant parts, such as flowers or leaves, including tobacco leaves or marijuana leaves.

An exemplary embodiment includes a red, heart shaped absorber canister that can be utilized in heart medication packaging because heart medication can be difficult to identify, especially in an emergency. Other exemplary embodiments include collectable absorber canisters having body part shapes, animals, and other shapes that can identify what the medical/benefits in a medication or vitamin bottle. Similarly, collectable absorber canisters can be shaped like food products to provide consumers with an easy way to identify such products. These exemplary embodiments can be used in advertising or marketing campaigns.

In yet another exemplary embodiment, shoe shaped absorber canisters can be used to provide would manufacturers with the ability to identify their products. Such absorber canisters can be used as a means for advertising or for promotional purposes. The absorber canisters can be scented with perfumes or with aromas for aromatherapy after use for long lasting scents. Other useful scents can be added to provide a pleasant scent in a room, prevent insect infestation, prevent the development of mold mildew, and/or for rust prevention.

In other embodiments, small amounts of chemical compounds or other specific compositions of matter can be added to absorbers contained with the absorber canisters for identification purposes. The chemical compounds or compositions of matter can function as chemical signatures. In some embodiments, the chemical compounds or compositions of matter can be identified using chemical and DNA marker analysis. Alternatively, the chemical compounds or compositions of matter can include radioactive components or organic compounds that include specific or unique identification characteristics.

The absorber can be a desiccant, an oxygen absorber, or other similar absorbing substances that are intended to protect perishable products. Desiccants are substances that absorb moisture, such as silica. Desiccants can be inert, nontoxic, and water-insoluble substances. Other common desiccants include activated charcoal, calcium sulfate, calcium chloride, and molecular sieves (typically, zeolites). Oxygen absorbers include iron salts (iron oxide), yeast, palladium catalysts, sugar alcohol/glycols, sulfites and/or boron.

Referring now to FIG. 1, there is shown a collecting device, generally designated by the numeral 100, in accordance with this disclosure. The collecting device 100 can be a wearable jewelry item that includes a plurality of collectable absorber canisters 110-132 and an absorber canister cover 134 extending therefrom, and a jewelry finding 136 that connects the collectable absorber canisters 110-132 to one another. In this exemplary embodiment, all of the components of the collecting device 100 are choke tube compliant.

The collecting device 100 functions as a system for holding the collectable absorber canisters 110-132 upon removal from packaging that stores perishable products. In its most expansive interpretation, the collecting device 100 can include key fobs, watch bobs, and items that can be hung on a wall, an interior surface of a collector's case, a car interior, or a similar surface for display. In some of these exemplary applications, the collectable absorber canisters 110-132 are not connected to the collecting device 100 and merely rest upon a shelf, a bottom, or other similar surface.

The jewelry finding 136 can include a flexible or malleable member 138 that can be formed into a loop and a clasping device 140 that can close the loop. Each of the collectable absorber canisters 110-132 and the absorber canister cover 134 includes an integral tubular fastening mechanism 142-166 for attaching to the jewelry finding 136. The collectable absorber canisters 110-132 can be attached to the jewelry finding 136 by disengaging the clasping device 140 to free the member 138. Then, the member 138 can be inserted into one or more of the tubular fastening mechanisms 142-166. In some embodiments, the flexible or malleable member 138 can be replaced by a rigid or semi-rigid member.

In other embodiments, the tubular fastening mechanisms 142-166 can be replaced by any suitable conventional or unconventional fastening mechanisms, including both tubular fastening mechanisms and other fastening mechanisms. Suitable fastening mechanisms include clips, clamps, clasps, magnets, and fastening mechanisms that incorporate s-hooks, pressure fit connections, soldered connections, adhesive connections, screws, snaps, push pins, lobster springs, barrel boxes, toggles, bayonet locks, twists, pop style connections, crimps, ribbons, jump rings, strings, and other similar components.

The collectable absorber canisters 110-132 can have any suitable predetermined outer configurations or shapes, including geometric shapes, organic shapes, inorganic shapes, and composite shapes. In this exemplary embodiment, the collectable absorber canister 110 has a decorative banana configuration, the collectable absorber canister 112 has a heart-shaped configuration, the collectable absorber canister 114 has a fish-shaped configuration, and the collectable absorber canister 116 has a tennis shoe-shaped configuration. The collectable absorber canisters 110 and 114-116 have organic shapes. The collectable absorber canister 112 has an inorganic or abstract shape.

The collectable absorber canister 114 includes a flat surface 168 that can display an indicator, such as indicia, text, a symbol, an image, or a combination thereof. In this exemplary embodiment, the indicator includes indicia. Any of the collectable absorber canisters 110-132 can include similar surfaces.

The collectable absorber canister 118 is shaped like a realistic looking tooth, which is an organic shape. The collectable absorber canister 120 has the shape of an edible object, namely a piece of candy, which is also an organic shape. The collectable absorber canister 122 has an organic shape, namely the shape of a human foot. The collectable absorber canisters 124-126 are shaped like boots, which are also organic shapes.

The collectable absorber canisters 128-130 are shaped like everyday, man-made objects. Specifically, the collectable absorber canister 128 is shaped like a personal computer. The collectable absorber canister 130 is shaped like a camera. Personal computers and cameras are organic shapes.

The collectable absorber canister 132 is shaped like a finger, which is an organic shape. The collectable absorber canister 132 can be inserted into the absorber canister cover 134, which is shaped like a glove. Other exemplary shapes are contemplated, including ice cream cones, teapots, and rings.

The collecting device 100 can be any suitable jewelry item capable of holding the collectable absorber canisters 110-132. Suitable jewelry items 100 include necklaces, chains, key rings, and bracelets. The jewelry finding 136 can be a strap, a ribbon, a band, a clasp, an earwire, a ring blank, a bail, metal loop, a jump ring, a hoop, a pin stem, a tuxedo stud finding, and stringing material. The collecting device 100 and, more specifically, the jewelry finding 136 can be made from any suitable metal, plastic, ceramic, or composite material and can be made through any suitable manufacturing process.

The collecting device 100 can be provided in unassembled form as a kit with the collectable absorber canisters 110-132 and the jewelry finding 136 being individual components of the kit. In some embodiments, the clasping device 140 can be integral with or permanently attached to the flexible or malleable member 138. In other embodiments, the flexible or malleable member 138 removeably separates from the clasping device 140, so that the flexible or malleable member 138 and the clasping device 140 can be components of the kit. In yet other embodiments, the components are fully assembled into a system, apparatus, or device. Alternatively, the collectable absorber canisters 110-132 and the jewelry finding 136 can be provided individually, with other components, or in various combinations, thereof.

The collectable absorber canisters 110-132 can be made from any suitable material through any suitable manufacturing method. Suitable materials include flexible, semi-flexible, rigid, or semi-rigid materials. Suitable materials also include ceramics, polymeric materials, and composites, and, in particular, plastics and metals. In this exemplary embodiment, the collectable absorber canisters 110-132 are formed through a molding process that utilizes tooling that is designed using 3D CAD drawings, 3D molds, or similar techniques. The collectable absorber canisters 110-132 can be any color, including metallic colors.

In some embodiments, one or more of the collectable absorber canisters 110-132 can include a cobalt chloride colored humidity indicator on an outer surface. The indicator can react to moisture to change from blue to pink when the humidity reaches a predetermined level. In other embodiments, the collectable absorber canisters 110-132 can include absorbing material that change color when a certain amount of humidity is present. Exemplary absorbing materials include orange or blue silica gel desiccants.

The collectable absorber canisters 110-132 can be emptied of the absorber material in some embodiments through, in some instances, soaking. The collectable absorber canisters 110-132 can include a dissolvable plug (not shown) to facilitate emptying.

Referring to FIGS. 2A-2D with continuous reference to the foregoing figures, an environment for another embodiment in accordance with this disclosure is shown. In this exemplary embodiment, a collectable absorber canister, generally designated with the numeral 200, is shown. The collectable absorber canister 200 has an individual shape or configuration that can be used for identification and for record keeping purposes. The shape is an inorganic or abstract shape.

The collectable absorber canister 200 has an outer configuration that can have a medical significance, pertains to food, and/or pertains to nourishment. In particular, the exemplary collectable absorber canister 200 has a heart-shape, like the collectable absorber canister 112 shown in FIG. 1. In other embodiments, the collectable absorber canister 200 can have the shape of a brain or another organ for an organism. The organ can be a human organ or an animal organ.

Figure 2A:
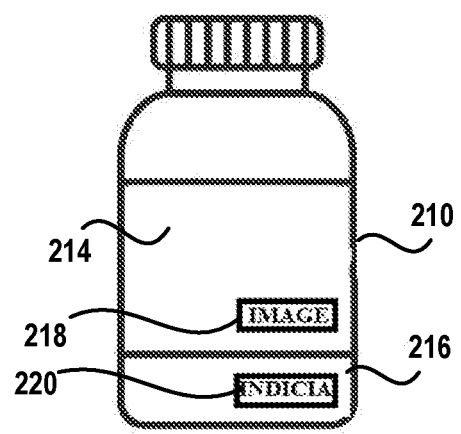
FIG. 2A is a plan view in side elevation of a container for holding a perishable product in accordance with this disclosure.
Figure 2B:
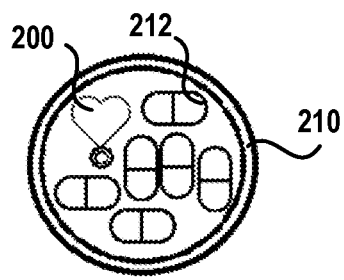
FIG. 2B is a top plan view of a cross section of the container shown in FIG. 2A in accordance with this disclosure.

As shown in FIGS. 2A-2B, the collectable absorber canister 200 can be packaged in a container 210 with a perishable product 212, which can be any type of medicine, food, edible product, or other perishable consumable item. In this exemplary embodiment, the perishable product 212 includes heart medicine. Other suitable products include any type of medicine for a human being or for an animal.

The configuration of the collectable absorber canister 200 has a predetermined relationship with the perishable product 212. The predetermined relationship between the collectable absorber canister 200 and the perishable product 212 provides for quick identification of the perishable product 212.

The container 210 can include one or more labels 214-216. Each label 214-216 can have one or more indicators 218-220 thereon or, in some embodiments, the indicators 218-220 can be directly imprinted to or affixed to the container 210. The indicators 218-220 can include indicia, text, a symbol, an image, or composite thereof thereon and can convey information about the collectable absorber canister 200, the container 210, and/or the perishable product 212. In this exemplary embodiment, indicator 218 can include an image, and the indicator 220 can include text.

In some embodiments, the indicators 218-220 can include microchips or other similar devices. The indicators 218-220 can include RFID technology that can be passive or active to convey information about the collectable absorber canister 200, the container 210, and/or the perishable product 212 upon activation or when read by a suitable reader (not shown). In other embodiments, the indicators 218-220 can be LED lighting chips and/or tracking chips.

The information can include medical information, dates, doses, reminder times, expiration dates, filled dates, manufacturing details, manufacturing dates, product details suppliers, component costs, landing, and other similar information. The information can be transmitted via Bluetooth technology, radio waves, UHF waves, and WIFI. The information can be read using computers, computing devices, RFID readers, and/or other similar technology.

The indicators 218-220 can have a predetermined relationship with the outer configuration of the collectable absorber canister 200 to enhance the ability to identify the perishable product 212. The relationship can be based upon the appearance of the outer configuration of the collectable absorber canister 200 or upon the meaning behind the appearance of the outer configuration of the collectable absorber container 200. In some embodiments, the shape of one or both of the indicators 218-220 will match the outer configuration of the collectable absorber canister 200. In other embodiments, the relationship is based upon a mnemonic device.

Figure 2C:
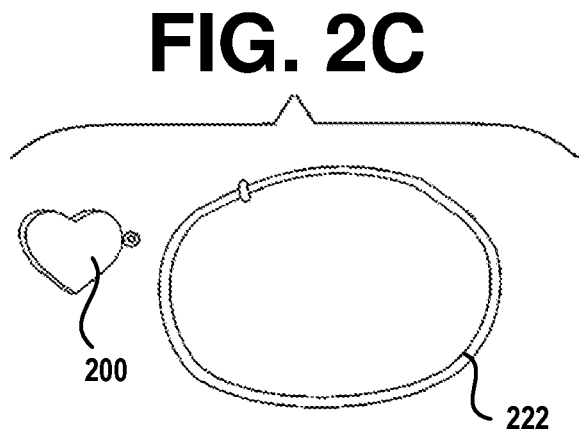
FIG. 2C is schematic diagram of a charm bracelet that includes a collectable absorber canister from FIG. 2B in accordance with this disclosure.

As shown in FIG. 2C, the collectable absorber canister 200 can be removed from the container 210 and attached to a jewelry finding 222 for storage thereon. The jewelry finding 222 can be essentially identical to the jewelry finding 136 shown in FIG. 1. The jewelry finding 136 can hold multiple copies of the collectable absorber canister 200 to signify a number of milestones that have passed during a particular treatment or dosage schedule. In this exemplary embodiment, the collectable absorber canister 200 can correspond to one or more different medications and/or supplements that are attached to the jewelry finding 222 that can act as a medical record identification when the patient goes to the doctor or to a hospital.

The jewelry finding 222 can be used for maintaining a collection of collectable absorber canisters, like collectable absorber canister 200. The collection can be maintained to serve as reminder of medical dosage schedules and/or as part of a medical treatment regime. The use of the collectable absorber canister 200 and the jewelry finding 222 can be particularly adapted to encourage and/or to remind children or similar patients to take their medicine. The collectable absorber canister 200 can inject an element of fun for children who do not enjoy taking their medicine.

In some embodiments, the collectable absorber canister 200 and the jewelry finding 222 can be incorporated into visual and digital vaccination record programs, such as the program developed by Arun Shanbhag of Manipal University in India as described at https://gcgh.grandchallenges.org/grant/vaccination-beads-visual-and-digital-vaccination-record downloaded on May 5, 2019. In other embodiments, the collectable absorber canister 200 and the jewelry finding 222 can be incorporated into programs that are similar to the Immunity Charm program as described in http://www.theimmunitycharm.org/downloaded on May 5, 2019.

Figure 2D:
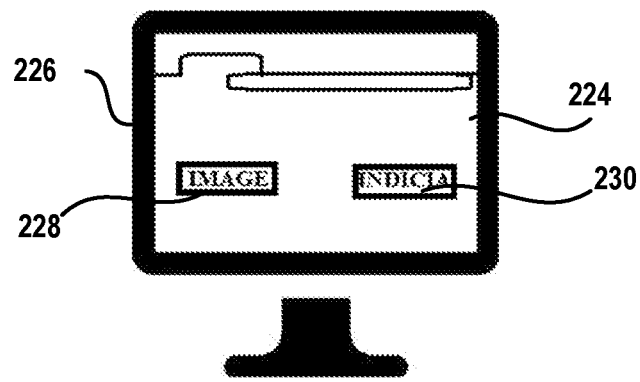
FIG. 2D is a schematic diagram of a network device in accordance with this disclosure.

Now referring to FIG. 2D, the outer configuration of the collectable absorber canister 200 shown in FIGS. 2B-2C can serve as an indicator or mnemonic device to provide access to a website 224 on a network device 226. The website 224 can display one or more indicators 228-230 that can convey information about the collectable absorber canister 200, the container 210, and/or the perishable product 212. The indicators 228-230 can have a relationship with the outer configuration of the collectable absorber canister 200 shown in FIGS. 2B-2C and/or the indicators 218-220 shown in FIG. 2A.

The network device 226 can be any suitable network device that can access the Internet, such as computing system, a computing device, a PC, a server computer, smartphone, a mobile device, a notebook computer, and an ipad.

Referring to FIGS. 3A-3D with continuous reference to the foregoing figures, another environment for another embodiment is shown. In this exemplary embodiment, a collectable absorber canister, generally designated with the numeral 300, is shown. The collectable absorber canister 300 is particularly adapted for advertising/marketing applications, advertisements, and advertising or marketing campaigns. The collectable absorber canister 300 can be used as part of a promotional program, a contest, sweepstakes, or a lottery. The collectable absorber canister 300 has an organic shape.

The collectable absorber canister 300 has an indicator 310 thereon. In particular, the exemplary collectable absorber canister 300 has a fish-shape, like the collectable absorber canister 114 shown in FIG. 1. The indicator 310 includes indicia, but can include text, a symbol, an image, or composite thereof. The indicator 310 can have advertising significance, relating to a product name, a company name, coupon codes, reward codes, or other similar information. The indicia can be printed on or molded into the collectable absorber canister 300.

The collectable absorber canister 300 can be packaged in a container 312 with a perishable product 314, which can be any type of medicine, food, edible product, or other perishable consumable item. The configuration of the collectable absorber canister 300 has a predetermined relationship with the perishable product 314. The indicator 310 can have predetermined relationship with the perishable product 314 or no relationship with the perishable product 314.

The container 312 can include one or more labels 316-318 that have indicators 320-322. The indicators 320-322 can have a predetermined relationship with the outer configuration of the collectable absorber canister 300 and/or the indicator 310. The collectable absorber canister 300 and, optionally, the indicators 310 and/or the indicators 320-322 can have a relationship to advertising material 324.

The advertising material 324 can convey information about the collectable absorber canister 300, the container 312, and/or the perishable product 314. The advertising material 324 can display one or more indicators 326-328 that can have a relationship to the collectable absorber canister 300 and/or the indicators 310 and/or the indicators 320-322. The advertising material 324 can be used in the environment shown in FIGS. 2A-2D to convey information about the collectable absorber canister 200, the container 210, and/or the perishable product 212.

The advertising material 324 can be displayed using an object selected from the group consisting of a billboard, a poster, a flyer, a video screen, a virtual billboard, a virtual poster, a virtual kiosk, a virtual bus, a virtual flyer, a virtual television, an online newspaper, an online magazine, and an online blog.

The indicators 310, 320-322, and/or 326-328 can convey information about the collectable absorber canister 300, the container 312, and/or the perishable product 314. The indicators 310, 320-322, and/or 326-328 can have a predetermined relationship with at least one of advertising copy, a coupon, and a Q code.

The advertising copy can include one or more product names, company names, association names, websites, phone numbers, physical addresses, social media sites, or other related information. The configuration of the collectable absorber canister 300 and/or the indicators 310, 320-322, and/or 326-328 can include a mnemonic device that provides access to a website 330 on a network device 332.

The website 330 can display one or more indicators 334-336 that can convey information about the collectable absorber canister 300, the container 312, and/or the perishable product 314. The indicators 334-336 can have a relationship with the outer configuration of the collectable absorber canister 300 and/or indicators 310, 320-322, and/or 326-328.

The indicators 334-336 can include information relating to advertising copy, a coupon, and a Q code. The advertising copy can include one or more product names, company names, association names, websites, phone numbers, physical addresses, social media sites, or other related information.

The website 330 can include additional information about the container 312, the perishable product 314, related products offered by the company that provides the perishable product 314, related companies, advertisements, marketing information, promotional information, specifications, price lists, intellectual property information, or other related information. The website 330 can include links to social media pages on one or more social media platforms (not shown).

Figure 4:
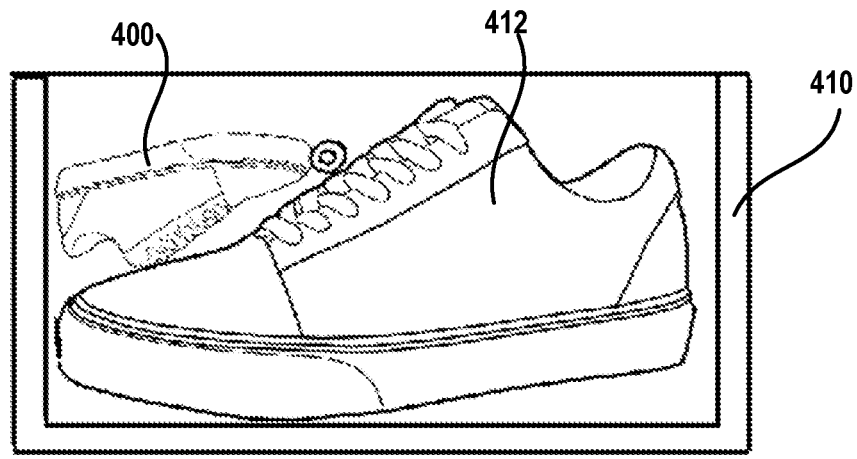
FIG. 4 is a cross section view in side elevation of a shoe container in accordance with this disclosure.

Referring to FIG. 4 with continuous reference to the foregoing figures, another environment for another embodiment is shown. In this exemplary embodiment, a collectable absorber canister, generally designated with the numeral 400, is shown. The collectable absorber canister 400 is stored in shoebox 410 with a tennis shoe 412. The collectable absorber canister 400 can be scented to scent the tennis shoe 412.

The collectable absorber canister 400 is has an organic shape. Specifically, the collectable absorber canister 400 is shaped like a tennis shoe, like the collectable absorber canister 116 shown in FIG. 1. The collectable absorber canister 400 can be stored on the collecting device 100 shown in FIG. 1. Similarly, the collectable absorber canister 400 can be used in systems that are similar to the systems shown in FIGS. 2A-2D.

The collectable absorber canister 400 can be used in advertising or promotional programs in the same manner as the collectable absorber canister 300 shown in FIGS. 3A-3D. The collectable absorber canister 400 can be collectable or cherishable. The collectable absorber canister 400 is more likely to be re-used when it has an attractive or ornamental shape.

In some embodiments, the collectable absorber canister 400 can have distinctive shapes that are associated with particular brands, trademarks, or other similar source identifiers. In such applications, the collectable absorber canister 400 can serve as protection from the purchase or sale of counterfeit products. The collectable absorber canister 400 can provide fraud protection in such implementations.

Referring now to FIG. 5 with continuous reference to the foregoing figures, another embodiment of a collecting device, generally designated by the numeral 500, is shown. In this exemplary embodiment, the collecting device 500 is a charm bracelet that includes a pair of collectable absorber canisters 510-512, a jewelry finding 514, and a pair of fastening mechanisms 516-518.

The collectable absorber canister 510 has the shape of a high heeled shoe, which is an organic shape. The collectable absorber canister 512 has the shape of realistically-looking heart, which is an organic shape. The jewelry finding 514 is a flexible chain.

The fastening mechanism 516 is a hoop. The fastening mechanism 518 is a chain formed from a plurality of interlocking hoops. The collectable absorber canisters 510-512 define holes 520-522 for receiving the fastening mechanisms 516-518.

Referring now to FIG. 6 with continuous reference to the foregoing figures, another embodiment of a collecting device, generally designated by the numeral 600, is shown. In this exemplary embodiment, the collecting device 600 is a charm bracelet that includes a single collectable absorber canister 610, a jewelry finding 612, and fastening mechanism 614.

The collectable absorber canister 610 has the shape of a heart symbol, which is an inorganic or abstract shape. The jewelry finding 612 is a flexible chain formed from a plurality of interlocking hoops. The fastening mechanism 614 is a hoop. The collectable absorber canister 610 defines a hole 616 for receiving the fastening mechanism 614.

Referring now to FIG. 7 with continuous reference to the foregoing figures, another embodiment of a collecting device, generally designated by the numeral 700, is shown. In this exemplary embodiment, the collecting device 700 is a keychain that includes a single collectable absorber canister 710, a jewelry finding 712, and a key 714.

The jewelry finding 712 is a flexible chain formed from a plurality of interlocking hoops that connects the collectable absorber canister 710 to the key 714. The collectable absorber canister 710 has an inorganic or abstract shape.

Referring now to FIG. 8 with continuous reference to the foregoing figures, another embodiment of a collecting device, generally designated by the numeral 800, is shown. In this exemplary embodiment, the collecting device 800 is a charm bracelet that includes a single collectable absorber canister 810, a jewelry finding 812, and fastening mechanism 814.

The collectable absorber canister 810 has the shape of a brain, which is an organic shape. The jewelry finding 812 is a flexible chain. The fastening mechanism 814 is a hoop. The collectable absorber canister 810 defines a hole 816 for receiving the fastening mechanism 814.

The collectable absorber canister 810 includes a microchip 818 that can be incorporated into the collectable absorber canister 810 to prevent counterfeiting. In such embodiments, the shape of the collectable absorber canister 810 and the microchip 818 can provide information that confirms that the collecting device 800 is authentic.

The microchip 818 can include information relating to the shape of the collectable absorber canister 810, the source of the collectable absorber canister 810, the jewelry finding 812, or any other information that is unique to the collecting device 800, the collectable absorber canister 810, or the source of the collecting device 800 and/or the collectable absorber canister 810. The information can be accessed through active or passive means.

Figure 3A:
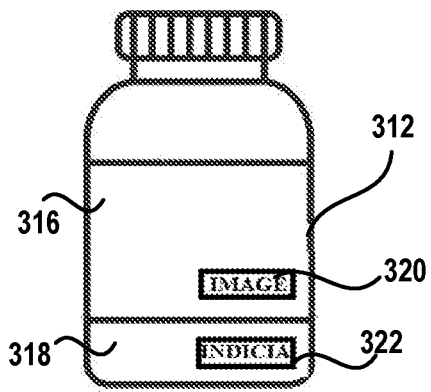
FIG. 3A is a plan view in side elevation of another embodiment of a container for holding a perishable product in accordance with this disclosure.
Figure 3B:
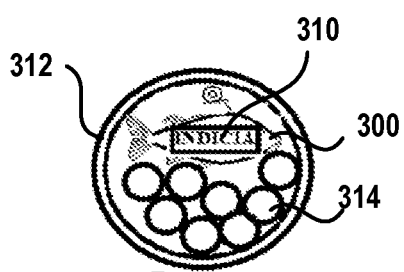
FIG. 3B is a top plan view of a cross section of the container shown in FIG. 3A in accordance with this disclosure.
Figure 3C:
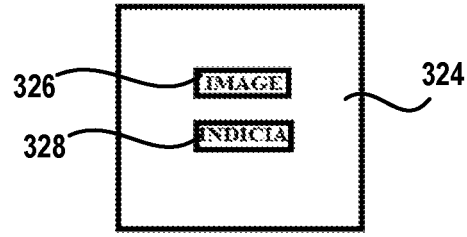
FIG. 3C is schematic diagram of an advertising flyer in accordance with this disclosure.
Figure 3D:
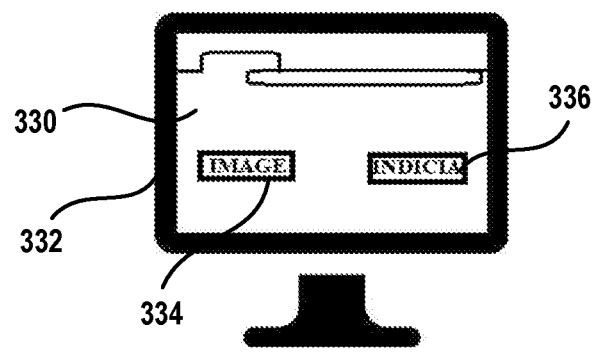
FIG. 3D is a schematic diagram of another embodiment of a network device in accordance with this disclosure.

In some embodiments, the microchip 818 can include information relating to perishable products, such as the perishable product 212 shown in FIG. 2B or the perishable product 314 shown in FIG. 3B. In other embodiments, the microchip 818 can include information relating to other products that are packaged with collectable absorber canister 810, such as the tennis shoe 412 shown in FIG. 4.

Figure 9A:
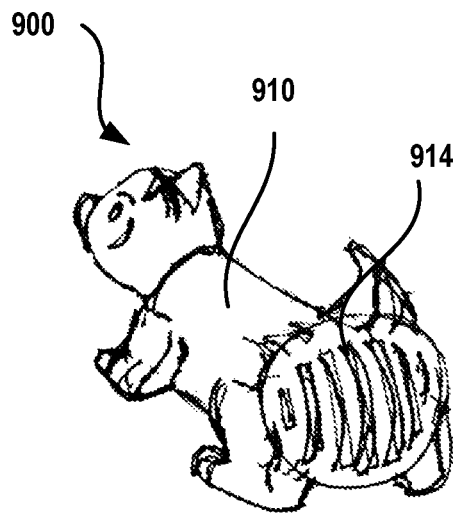
FIG. 9A is a perspective view of an exemplary collectable absorber canister in accordance with this disclosure.
Figure 9B:
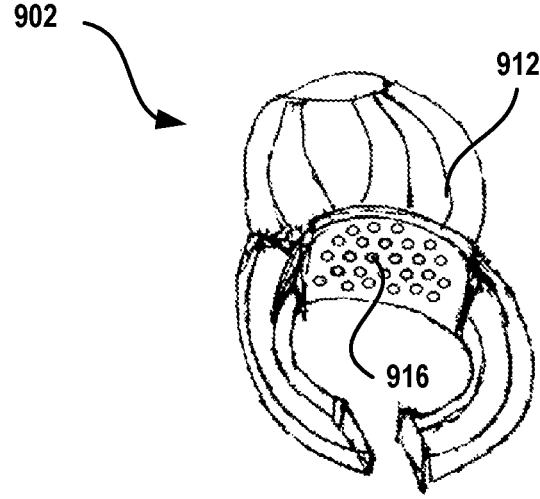
FIG. 9B is a perspective view of another exemplary collectable absorber canister in accordance with this disclosure.

Referring to FIGS. 9A-9B with continuous reference to the foregoing figures, exemplary collectable absorber canisters, generally designated by the numerals 900 and 902 are shown. The collectable absorber canister 900 includes an animal-shaped body 910. The collectable absorber canister 902 includes a ring-shaped body 912. The collectable absorber canisters 900-902 are suitable for use with the collecting device 100 shown in FIG. 1.

Unlike the collectable absorber canisters 110-132 shown in FIG. 1, the collectable absorber canister 900 can include elongated tapered holes 914 in the body 910 to vent the absorber material held therein. Some embodiments of the collectable absorber canister 900 can have a row of lines on their outer surfaces to ventilate the absorber material. The collectable absorber canister 900 can be scented.

The elongated tapered holes 912 can form elongated vents. The elongated tapered holes 912 can have straight sides or angled sides to direct the flow of scents or odors from the absorbers contained therein. The elongated tapered holes 912 can have any geometric configuration, such as being straight or wavy.

As shown in FIG. 9B, the collectable absorber canister body 912 includes a plurality of holes 916 that form a porous surface. In this exemplary embodiment, the holes 916 are small circular holes, but it is contemplated that various regular or irregular shaped holes of varying sizes are suitable for this application.

Figure 10:
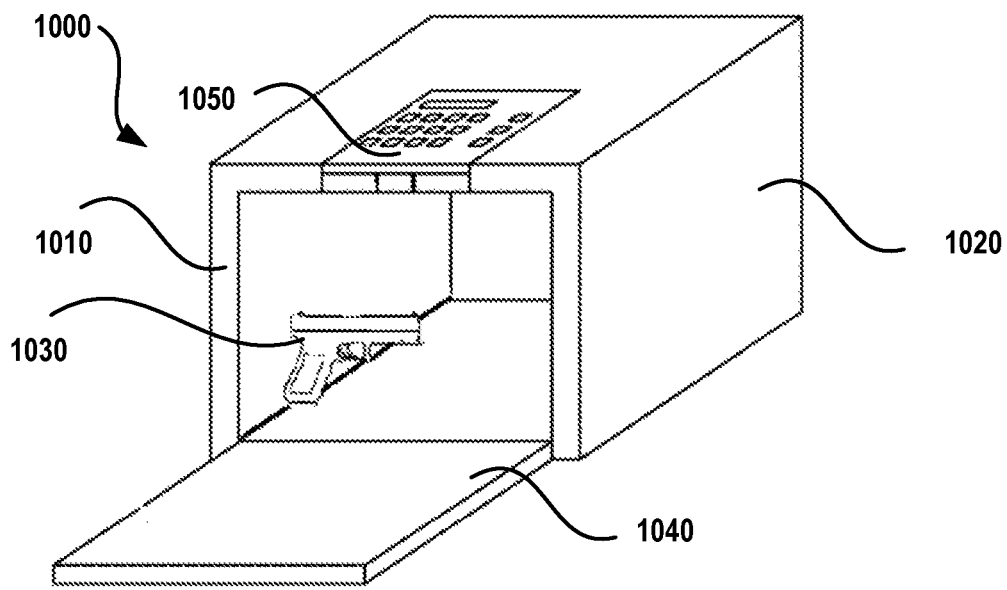
FIG. 10 is a perspective view of a gun safe storing an exemplary collectable absorber canister in accordance with this disclosure.

Referring now to FIG. 10 with continuous reference to the foregoing figures, another exemplary embodiment in the form of a gun safe, generally designated by the numeral 1000, is shown. In this exemplary embodiment, the gun safe 1000 includes a body 1010 defining a chamber 1020 for storing an absorber canister 1030. The gun safe 1000 also includes a door 1040 and an electronic locking device 1050 for locking the door 1040 to enclose the absorber canister 1030.

The absorber canister 1030 has a gun-shape configuration. However, the absorber canister 1030 can have any suitable configuration that is consistent with this disclosure.

Figure 11:
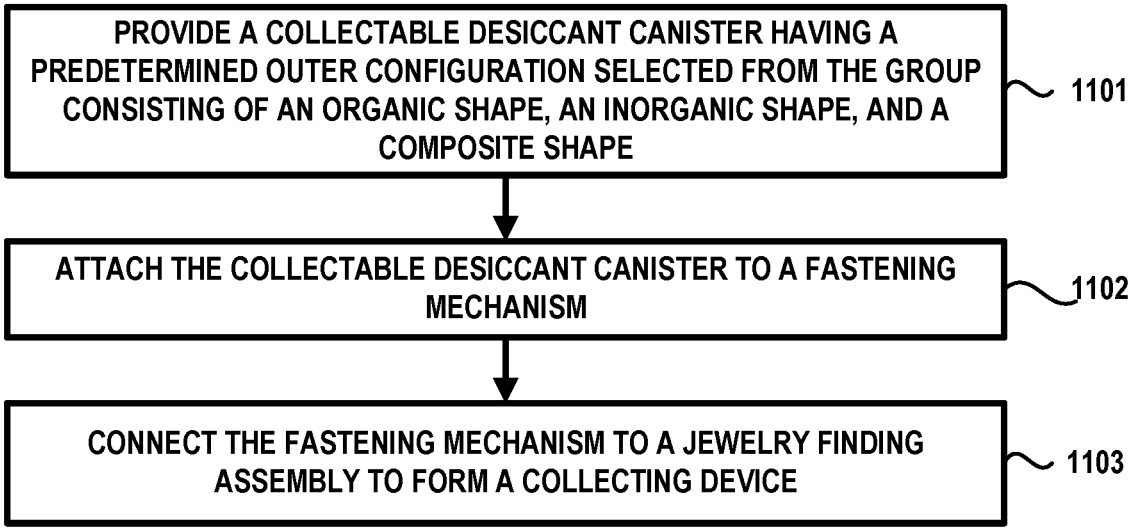
FIGS. 11-12 are exemplary processes in accordance with this disclosure.

Referring to FIG. 11 with continuous reference to the foregoing figures, a method 1100 for collecting collectable absorber canisters in accordance with the described subject matter is shown. Method 1100, or portions thereof, can be performed to collect the collectable absorber canisters 110-132, 200, 300, 400, 510-512, 610, 710, 810, and/or 900-902 shown in FIGS. 1-9B.

At step 1101, a collectable absorber canister having a predetermined outer configuration selected from the group consisting of an organic shape, an inorganic shape, and a composite shape is provided. In this exemplary embodiment, the collectable absorber canister can be the collectable absorber canisters 110-132, 200, 300, 400, 510-512, 610, 710, 810, and/or 900-902 shown in FIGS. 1-9B.

At 1102, the collectable absorber canister is attached to a fastening mechanism. In this exemplary embodiment, the fastening mechanism can be the fastening mechanisms 142-166, 516-518, 614, and/or 814 shown in FIGS. 1, 5, 6, and/or 8.

At 1103, the fastening mechanism is connected to a jewelry finding assembly to form a collecting device. In this exemplary embodiment, the flexible member can be the flexible or malleable member 138 shown in FIG. 1 and/or the jewelry finding 514, 612, 712 and/or 812 shown in FIGS. 5-8.

Figure 12:
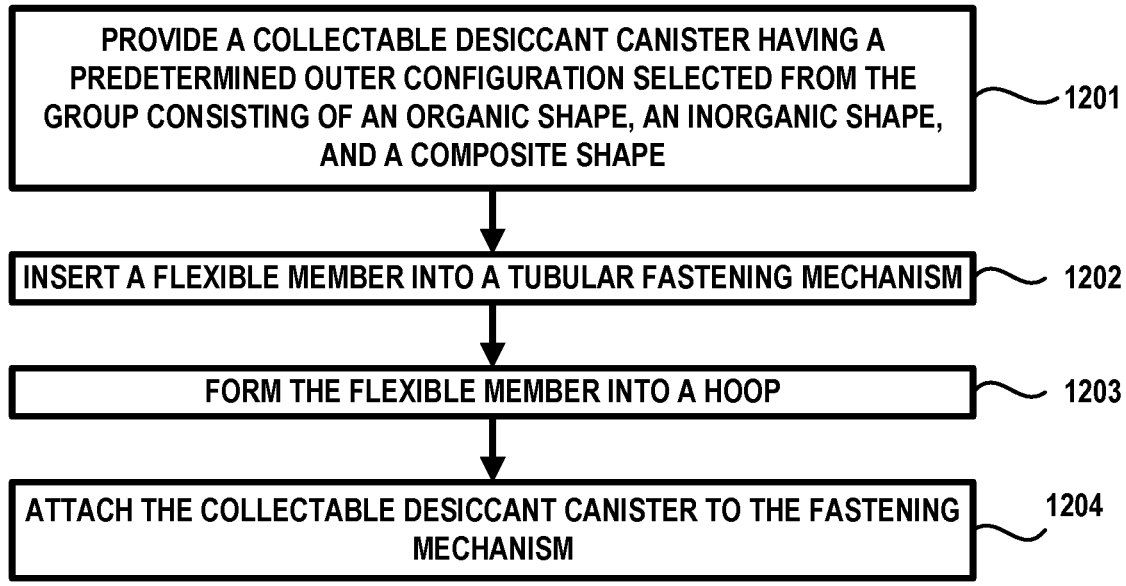

Referring to FIG. 12 with continuous reference to the foregoing figures, a method 1200 for collecting collectable absorber canisters in accordance with the described subject matter is shown. Method 1200, or portions thereof, can be performed to collect the collectable absorber canisters 110-132, 200, 300, 400, 510-512, 610, 710, 810, and/or 900-902 shown in FIGS. 1-9B.

At step 1201, a collectable absorber canister having a predetermined outer configuration selected from the group consisting of an organic shape, an inorganic shape, and a composite shape is provided. In this exemplary embodiment, the collectable absorber canister can be the collectable absorber canisters 110-132, 200, 300, 400, 510-512, 610, 710, 810 and/or 900-902 shown in FIGS. 1-9B.

At 1202, a flexible member is inserted into a tubular fastening mechanism. In this exemplary embodiment, the flexible member can be the flexible or malleable member 138 shown in FIG. 1 and/or the jewelry finding 514, 612, 712 and/or 812 shown in FIGS. 5-8.

At 1203, the flexible member is formed into a hoop. It should be understood, that the hoop can have any suitable tubular, geometric shape.

At 1204, the collectable absorber canister is connected to the fastening mechanism. In this exemplary embodiment, the fastening mechanism can be the fastening mechanisms 142-166, 516-518, 614, and/or 814 shown in FIGS. 1, 5, 6, and/or 8.

The above-disclosure is directed to collectable absorber canisters that can have various predetermined configurations that correspond to animals, charms, surprises, and other similar objects, as opposed to the conventional shapes (i.e., cylinders, bags, and sheets). The predetermined configurations can include geometric shapes, organic shapes, inorganic (i.e., abstract shapes), or composite shapes that are combination of two or more of these shape classifications. These shapes can include shapes of numbers, letters, symbols, and logos. The collectable absorber canisters that can be used in custom visual identification systems that can have medical, food-related, and/or advertising applications. Such canisters can provide consumers with the ability to quickly identify products that are packaged therewith.

The disclosed collectable absorber canisters that are used in bottles and packages to identify unique products for pharmaceutical, vitamins, and food products. The canisters can be incorporated in toys or game, especially children's toys or games. It is further contemplated that such canisters can be used in other similar applications and/or activities. In some embodiments, the collectable absorber canisters can be used with painting kits and/or include decorative colors. The disclosed canisters can include environmentally friendly collectable absorber canisters that can be re-used and recycled to minimize landfill material and environmental waste.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A system for identifying a perishable product, the system comprising:
   a container for storing the perishable product, and
   a collectable desiccant canister for inserting into the container having a fastening mechanism thereon,
   a wearable jewelry item having at least one jewelry finding with the at least one jewelry finding connecting the collectable desiccant canister fastening mechanism thereto, and
   a network device having a screen thereon,
   wherein the collectable desiccant canister has a predetermined outer configuration and a fastening mechanism extending therefrom with the predetermined outer configuration being a leaf, and
   wherein the container has an indicator thereon with the indicator has a relationship with the collectable desiccant canister predetermined outer configuration and the network device screen can display information relating to the indicator.

2. The system of claim 1, wherein the indicator matches the collectable desiccant canister predetermined outer configuration.

3. The system of claim 1, wherein the at least one jewelry finding receives at least a portion of the collectable desiccant canister fastening mechanism therein.

4. The system of claim 1, wherein the fastening mechanism is a tubular ring.

5. The system of claim 1, wherein the jewelry finding is selected from the group consisting of a strap, a ribbon, a band, a clasp, an earwire, a ring blank, a bail, metal loop, a jump ring, a hoop, a pin stem, a tuxedo stud finding, and stringing material.

6. The system of claim 1, wherein the collecting device includes a wearable jewelry item selected from the group consisting of a necklace, a chain, a key ring, and a bracelet.

7. The system of claim 1, wherein the indicator is selected from the group consisting of an indicia, text, a symbol, and an image thereon and the indicator matches the collectable desiccant canister predetermined outer configuration.

8. The system of claim 7, wherein the indicator is a first indicator and the collectable desiccant canister includes a second indicator selected from the group consisting of an indicia, text, a symbol, and an image thereon and the second indicator has a predetermined relationship with the first indicator.

9. The system of claim 1, wherein the network device is selected from the group consisting of a computing system, a computing device, a PC, a server computer, smartphone, a mobile device, a notebook computer, and an ipad, for interfacing with a website, and the indicator provides access to the website.

10. The system of claim 1, wherein the indicator has a predetermined relationship with at least one of advertising copy, a coupon, and a Q code.

11. The system of claim 1, wherein the indicator includes a radio-frequency identification chip.

12. A system for identifying a perishable product, the system comprising:
a container for storing the perishable product, and
a collectable desiccant canister for inserting into the container having a fastening mechanism thereon,
a wearable jewelry item having at least one jewelry finding with the at least one jewelry finding connecting the collectable desiccant canister fastening mechanism thereto, and an advertising object selected from the group consisting of a billboard, a poster, a flyer, a video screen, a virtual billboard, a virtual poster, a virtual kiosk, a virtual bus, a virtual flyer, a virtual television, an online newspaper, an online magazine, and an online blog,
wherein the collectable desiccant canister has a predetermined outer configuration and a fastening mechanism extending therefrom with the predetermined outer configuration being a leaf,
wherein the container has an indicator thereon with the indicator has a relationship with the collectable desiccant canister predetermined outer configuration, and
wherein the advertising object includes a screen for displaying information relating to the indicator.

13. The system of claim 12, wherein the indicator matches the collectable desiccant canister predetermined outer configuration.

14. The system of claim 12, wherein the indicator is selected from the group consisting of an indicia, text, a symbol, and an image thereon and the indicator matches the collectable desiccant canister predetermined outer configuration.

15. The system of claim 14, wherein the indicator is a first indicator and the collectable desiccant canister includes a second indicator selected from the group consisting of an indicia, text, a symbol, and an image thereon and the second indicator has a predetermined relationship with the first indicator.

16. The system of claim 15, wherein the indicator is a first indicator and the collectable desiccant canister includes a second indicator selected from the group consisting of an indicia, text, a symbol, and an image thereon and the second indicator is displayed on the advertising object advertising area.

17. The system of claim 12, wherein the indicator includes a radio-frequency identification chip.

18. A system for identifying a perishable product, the system comprising:
a container for storing the perishable product, and
a collectable desiccant canister for inserting into the container having an RFID indicator thereon, and
a display device,
wherein the collectable desiccant canister has a predetermined outer configuration and a fastening mechanism extending therefrom with the predetermined outer configuration being a leaf, and
wherein the RFID indicator has information relating to the collectable desiccant canister predetermined outer configuration and the perishable product and the display device can display the information thereon.

* * * * *